US011374228B2

(12) United States Patent
Zheng et al.

(10) Patent No.: US 11,374,228 B2
(45) Date of Patent: Jun. 28, 2022

(54) METALLIC TEXTILES FOR FLEXIBLE WEARABLE LITHIUM ION BATTERIES

(71) Applicant: The Hong Kong Research Institute of Textiles and Apparel Limited, Hong Kong (CN)

(72) Inventors: Zijian Zheng, Hong Kong (CN); Dongrui Wang, Hong Kong (CN)

(73) Assignee: The Hong Kong Research Institute of Textiles and Apparel Limited, Hong Kong (CN)

( * ) Notice: Subject to any disclaimer, the term of this patent is extended or adjusted under 35 U.S.C. 154(b) by 303 days.

(21) Appl. No.: 16/609,253

(22) PCT Filed: Dec. 14, 2017

(86) PCT No.: PCT/CN2017/116130
§ 371 (c)(1),
(2) Date: Oct. 29, 2019

(87) PCT Pub. No.: WO2019/113881
PCT Pub. Date: Jun. 20, 2019

(65) Prior Publication Data
US 2020/0259185 A1 Aug. 13, 2020

(51) Int. Cl.
*H01M 4/74* (2006.01)
*D06M 11/83* (2006.01)
(Continued)

(52) U.S. Cl.
CPC .............. *H01M 4/74* (2013.01); *D06M 11/83* (2013.01); *H01M 4/485* (2013.01);
(Continued)

(58) Field of Classification Search
None
See application file for complete search history.

(56) References Cited

U.S. PATENT DOCUMENTS

2013/0011742 A1    1/2013  Park et al.

FOREIGN PATENT DOCUMENTS

CN    1313646 A    9/2001
CN    1966765 A    5/2007
(Continued)

OTHER PUBLICATIONS

Lee et al., Nano Lett. 2013, 13, 5753-5761.*
(Continued)

*Primary Examiner* — Zhongqing Wei
(74) *Attorney, Agent, or Firm* — Scully, Scott, Murphy & Presser, P.C.

(57) ABSTRACT

This disclosure provides a method for preparing a current collector. The method includes: (1) anchoring vinyl groups onto the surface of textiles through the silanization between hydroxyl groups and coupling agents; (2) synthesizing polyelectrolyte brushes through in-situ radical polymerization; and (3) obtaining catalyst ions on the polyelectrolyte brushes through ion-exchange and obtaining metal-coated layers through subsequent electroless deposition). The current collector according to the present disclosure has high electrical conductivity and excellent mechanical flexibility, and thus the lithium ion battery including the same is suitable for portable and wearable electronic devices.

13 Claims, 10 Drawing Sheets

(51) Int. Cl.
- *H01M 10/0525* (2010.01)
- *H01M 4/58* (2010.01)
- *H01M 4/485* (2010.01)
- *H01M 4/66* (2006.01)
- *D06M 101/06* (2006.01)
- *D06M 101/32* (2006.01)
- *H01M 4/02* (2006.01)

(52) U.S. Cl.
CPC ......... *H01M 4/5825* (2013.01); *H01M 4/667* (2013.01); *H01M 4/668* (2013.01); *H01M 10/0525* (2013.01); *D06M 2101/06* (2013.01); *D06M 2101/32* (2013.01); *H01M 2004/021* (2013.01)

(56) References Cited

FOREIGN PATENT DOCUMENTS

| | | | |
|---|---|---|---|
| CN | 101892470 | A | 11/2010 |
| CN | 102121194 | A | 7/2011 |
| CN | 102985595 | A | 3/2013 |
| CN | 102995395 | A * | 3/2013 |
| CN | 103548190 | A | 1/2014 |
| CN | 104617334 | A | 5/2015 |
| CN | 105762365 | A | 7/2016 |
| CN | 106654285 | A | 5/2017 |
| CN | 106898729 | A | 6/2017 |
| JP | H05-290838 | A | 11/1993 |
| TW | 516252 | B | 1/2003 |

OTHER PUBLICATIONS

International Search Report dated Jun. 7, 2018 issued in PCT/CN2017/116130.
Lee Y-H et al., "Wearable Textile Battery Rechargeable by Solar Energy", Nano Letters 13(11):5753-5761 (Nov. 4, 2013).
Liu X. et al., "Surface-Grafted Polymer-Assisted Electroless Deposition of Metals for Flexible and Stretchable Electronics", An Asian Journal 7(5):862-870 (Mar. 5, 2012).
European Extended Supplementary Search Report dated Oct. 21, 2020 received in European Application No. 17 93 4404.9.

* cited by examiner

METALLIC TEXTILES FOR FLEXIBLE WEARABLE LITHIUM ION BATTERIES

TECHNICAL FIELD

This disclosure relates to the field of electrochemical field, and in particular, to a current collector, a method for preparing the same and a lithium ion battery comprising the same.

BACKGROUND

Wearable lithium ion batteries with high energy density, high power density, and robust mechanical stability are highly desired as the rapid development of portable and wearable electronic devices. However, the existing lithium ion batteries constructed on Al/Cu metal foils are bulky and hardly flexible which cannot withstand mechanical deformations such as bending, folding, crumping and the like. Many prototype flexible lithium ion batteries employed carbon materials including carbon nanotube film, graphene film, and carbonized textiles as current collectors. However, this kind of lithium ion batteries suffered from the intrinsic low electrical conductivity and brittle nature of carbon materials, showing deteriorated electrochemical energy storage capacity and relatively weak mechanical flexibility. Ideal materials with high electrical conductivity and superior mechanical flexibility for current collectors of lithium ion batteries are still missing.

SUMMARY

The present disclosure provides a method for preparing current collector. The method includes: (1) anchoring vinyl groups onto the surface of textiles through the silanization of the hydroxyl groups on the surface of the textile with a coupling agent; (2) synthesizing polyelectrolyte brushes on the surface of the textile through in-situ radical polymerization; and (3) forming catalyst ions on the polyelectrolyte brushes through ion-exchange and forming metal-coated layers through subsequent electroless deposition (ELD).

According to an embodiment, the coupling agent is selected form silane coupling agents.

According to another embodiment, the catalyst ion is $PdCl_4^{2-}$.

According to another embodiment, the metal-coated layer is a copper-coated layer or a nickel-coated layer.

According to another embodiment, the textile is formed from at least one of cotton and polyester.

The present disclosure further provides a current collector preparing by any of the said methods.

According to an embodiment, the current collector has a sheet resistance of less than 0.25 ohms/square.

The present disclosure further provides a lithium ion battery including any of the said current collectors.

According to an embodiment, an anode material of the lithium ion battery contains $Li_4Ti_5O_{12}$.

According to another embodiment, a cathode material of the lithium ion battery contains $LiFePO_4$.

The current collector according to the present disclosure has high electrical conductivity and excellent mechanical flexibility, and thus the lithium ion battery including the same is suitable for portable and wearable electronic devices.

DETAILED DESCRIPTION

Pre-cleaned textile fabrics were firstly immersed in a mixture of ethanol, acetic acid, and water (95/1/4, v/v/v). After the addition of 1 mL of γ-methacryloxypropyltrimethoxysilane (KH570), the silanization was carried out at room temperature for 1 h. Subsequently, the silane-modified fabrics were immersed into a 10% (v/v) aqueous solution of 2-(methacryloyloxy)ethyltrimethylammonium chloride (METAC) for 60 min at 80° C. to perform the radical polymerization by using potassium persulfate as initiator. Then, the PMETAC-grafted fabrics were immersed in a 5 mM aqueous solution of $(NH_4)_2PdCl_4$ for 20 min to immobilize $PdCl_4^{2-}$ through ion exchange. Finally, the fabrics were immersed into ELD baths for different time intervals to prepare metal-coated fabric current collectors. Cu-coated and Ni-coated fabrics were prepared by using different ELD baths.

The copper-containing ELD bath for preparing a copper-coated fabric is an aqueous solution of NaOH at a concentration of 12 g/L, $CuSO_4 \cdot 5H_2O$ at a concentration of 13 g/L, sodium potassium tartrate ($KNaC_4H_4O_6 \cdot 4H_2O$) at a concentration of 29 g/L, and HCHO at a concentration of 9.5 mL/L. Cu-coated fabrics were prepared by electroless deposition in the said bath for 5 minutes to 2 hours at 25° C.

The nickel-containing ELD bath for preparing a nickel-coated fabric is an aqueous solution of nickel sulfate hexahydrate at a concentration of 40 g/L, sodium citrate at a concentration of 20 g/L, lactic acid ($C_3H_6O_3$) at a concentration of 10 g/L, and dimethylamine borane (DMAB) at a concentration of 1 g/L. Ni-coated fabrics were prepared by electroless deposition in the said bath for 5 minutes to 2 hours at 25° C.

Typical photos of resultant metal-coated fabrics are shown as FIGS. 2A-5B. High quality metal-coated fabrics are obtained by carefully controlling the fabrication process.

The conductivity of prepared metal-coated fabrics was characterized by using a home-made clamp via the four-probe method. Fabrics were cut into pieces with the dimension of 5 cm*1 cm, sheet resistance was measured using Keithley 2400 source meter.

Cu-coated and Ni-coated polyester fabrics after 90 mM of ELD, have a sheet resistance as low as 0.25 ohms/square.

Figure 1:
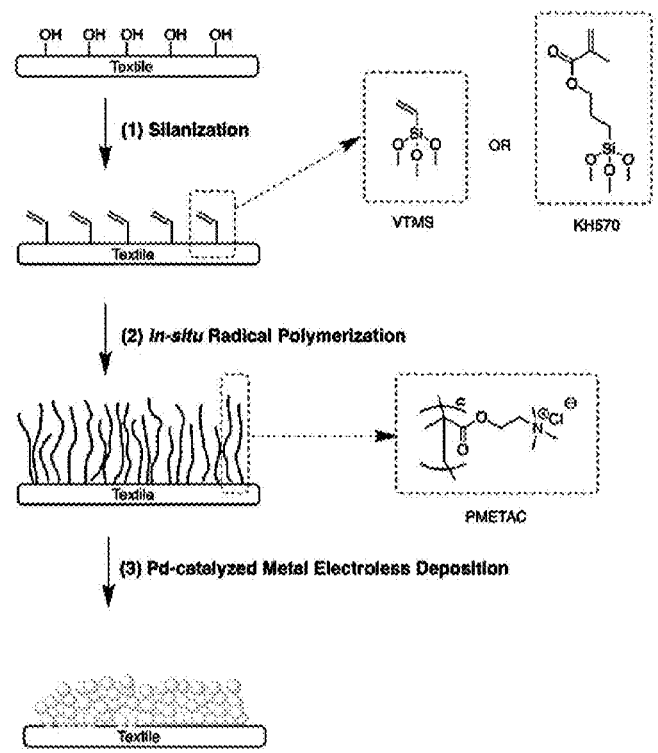
FIG. 1 is a schematic illustration of the preparation of current collectors according to the methods of the present disclosure.
Figure 2A:
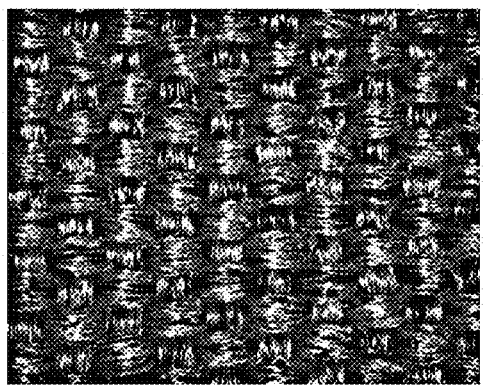
FIG. 2A is an optical image of a Cu-coated polyester fabric current collector.
Figure 2B:
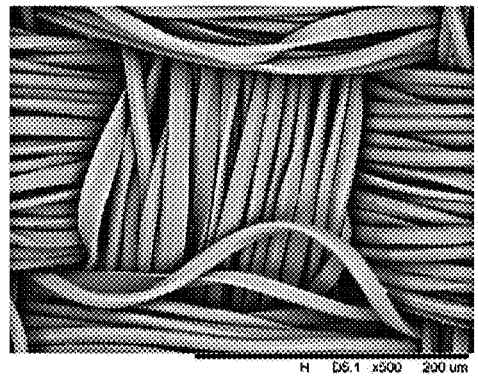
FIG. 2B is a SEM image of a Cu-coated polyester fabric current collector.
Figure 3A:
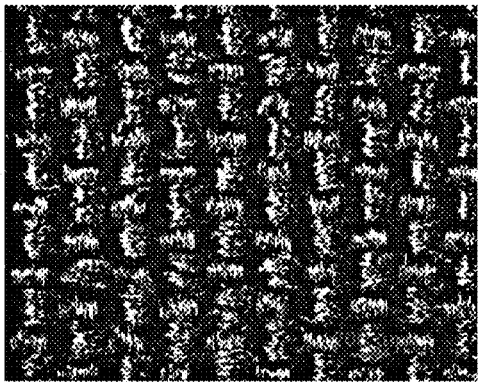
FIG. 3A is an optical image of a Ni-coated polyester fabric current collector.
Figure 3B:
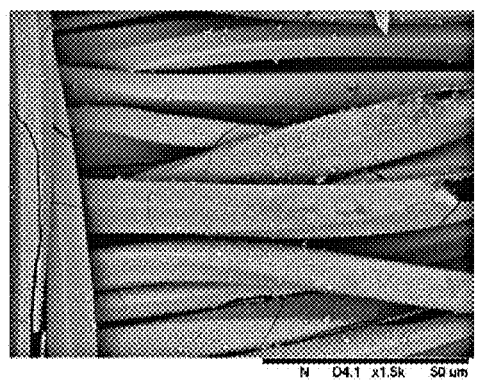
FIG. 3B is a SEM image of a Ni-coated polyester fabric current collector.
Figure 4A:
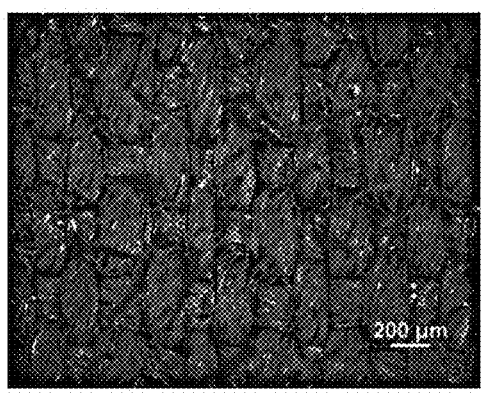
FIG. 4A is an optical image of a Cu-coated cotton fabric current collector.
Figure 4B:
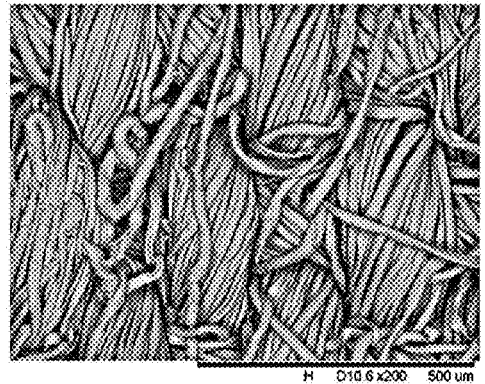
FIG. 4B is a SEM image of a Cu-coated cotton fabric current collector.
Figure 5A:
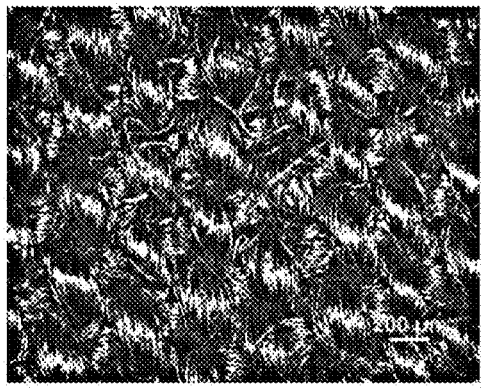
FIG. 5A is an optical image of a Ni-coated cotton fabric current collector.
Figure 5B:
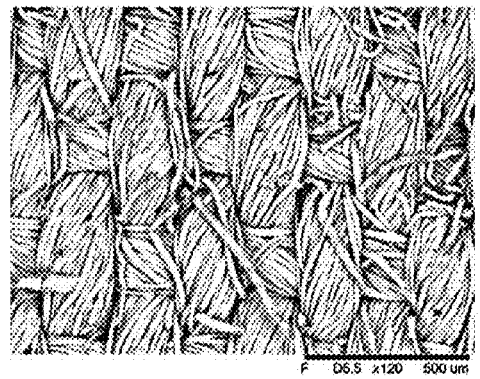
FIG. 5B is a SEM image of a Ni-coated cotton fabric current collector.
Figure 6:
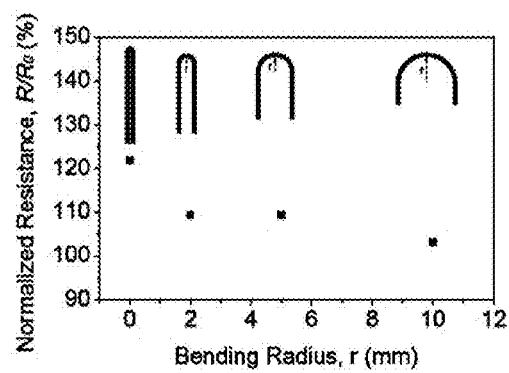
FIG. 6 is a view showing electrical resistances of a Ni-coated polyester fabric at different bending angles.
Figure 7:
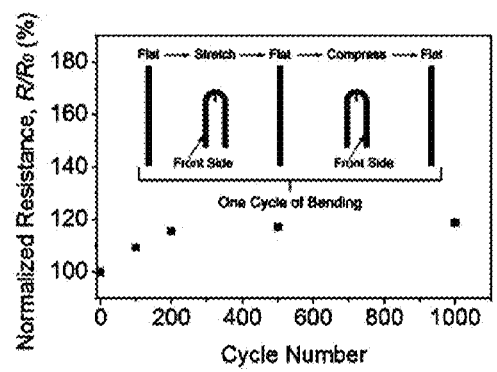
FIG. 7 is a view showing electrical resistance changes of a Ni-coated polyester fabric with bending radius of 1 mm.

The prepared metal-coated fabrics were bent at different radii of curvature to evaluate the stability of the conductivity. The resistance change of Ni-coated polyester fabric after bending into different angles is shown as FIG. 6. The resistance increased slightly under bending. It can be observed that only 20% increment in the resistance was achieved when the conductive fabric underwent folding. Furthermore, the fabric was bent for 1000 cycles to evaluate the stability. FIG. 7 shows that the resistance increased about 20% after the cyclic tests. It is also observed that the prepared metallic fabrics show nearly no change after several times of folding. All these results indicate that the prepared conductive fabrics are suitable for the wearable lithium ion battery applications.

Cu-coated/Ni-coated fabrics prepared as described above were utilized as the current collectors. $Li_4Ti_5O_{12}$ (LTO) and $LiFePO_4$ (LFP) were selected as the active materials for anode and cathode, respectively. The slurries were prepared by mixing active materials ($Li_4Ti_5O_{12}$ or $LiFePO_4$), conductive carbon black, and polymer binder polyvinylidene fluoride (PVDF) in the weight ratio of 8:1:1 in N-methylpyrrolidone (NMP). The LTO-containing slurry was then uniformly applied to the prepared Cu-coated fabric current collector, or the LFP-containing slurry was uniformly applied to the prepared Ni-coated fabric current collector. After drying at 80° C. for 4 h, the electrodes were cut into electrodes with preset shapes. The electrodes were assembled into half cells by using the obtained metallic textile-based electrodes and lithium foils as work electrodes and counter electrodes, respectively. Porous polyethylene (PE) films with the thickness of 20 μm were utilized as the separator. The solution of 1M $LiPF_6$ in EC/DMC (1:1, v/v) was used as the electrolyte. All the cells were assembled in glove box under argon atmosphere with the water and oxygen content lower than 1 ppm.

Figure 8:
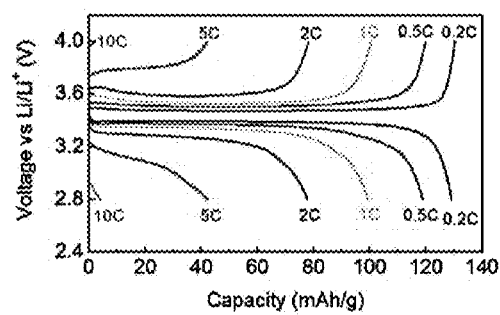
FIG. 8 is charging/discharging profiles of LFP/Ni-Cotton electrodes under different C rates.
Figure 9:
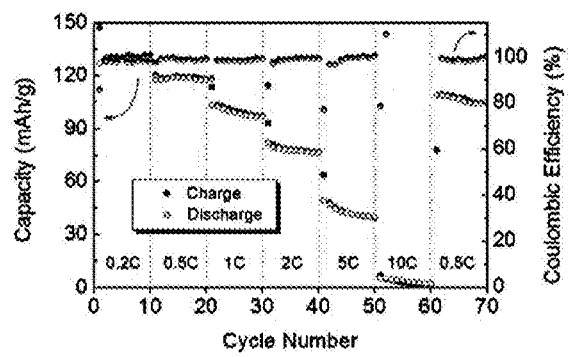
FIG. 9 shows capacity and coulombic efficiency of LFP/Ni-Cotton electrodes versus cycle number under different C rates.

The electrochemical performance of LFP/Ni-Cotton electrodes is shown as FIG. 8 and FIG. 9. The electrodes deliver good energy storage capacity under various C rates from 0.2 to 10 C. The discharged specific capacity of LFP on Ni-coated cotton fabric is ca. 130, 120, 100, 80, 45, 10 mAh/g under C rates of 0.2, 0.5, 1, 2, 5, 10, respectively.

Figure 10:
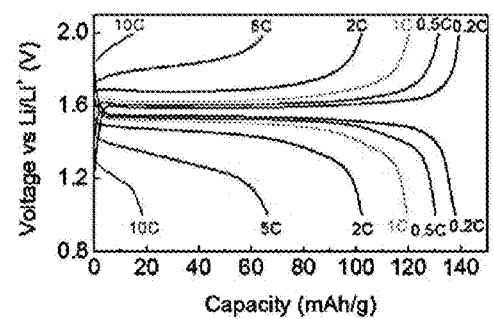
FIG. 10 is charging/discharging profiles of LTO/Cu-Cotton electrodes under different C rates.
Figure 11:
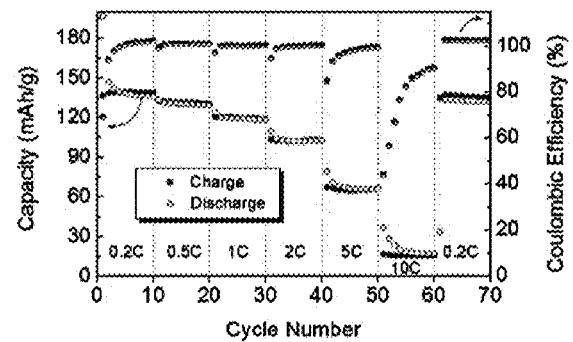
FIG. 11 shows capacity and coulombic efficiency of LTO/Cu-Cotton electrodes versus cycle number under different C rates.

The electrochemical performance of LTO/Cu-Cotton electrodes is shown as FIG. 10 and FIG. 11. The electrodes also can deliver good energy storage capacity under various C rates from 0.2 to 10 C. The discharged specific capacity of LTO on Cu-coated cotton fabric is ca. 140, 130, 120, 100, 65, 20 mAh/g under C rates of 0.2, 0.5, 1, 2, 5, 10, respectively.

Figure 12:
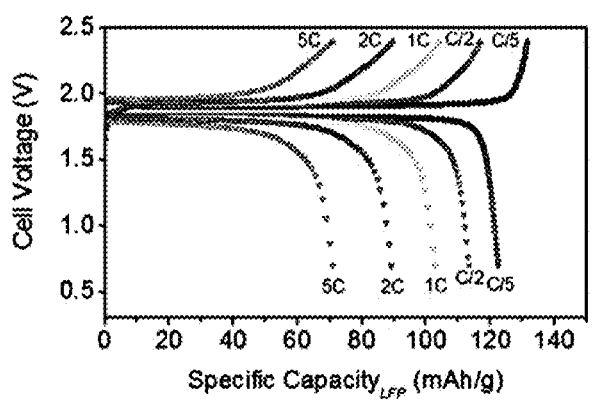
FIG. 12 is charge/discharge profiles under different C rates of a flexible lithium ion battery by using LFP/Ni-Cotton as the cathode and LTO/Cu-Cotton as the anode.
Figure 13:
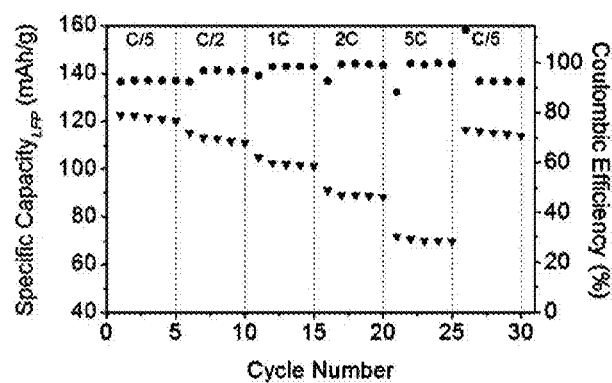
FIG. 13 is discharged capacities and coulombic efficiency of a flexible lithium ion battery by using LFP/Ni-Cotton as the cathode and LTO/Cu-Cotton as the anode under different C rates.
Figure 14:
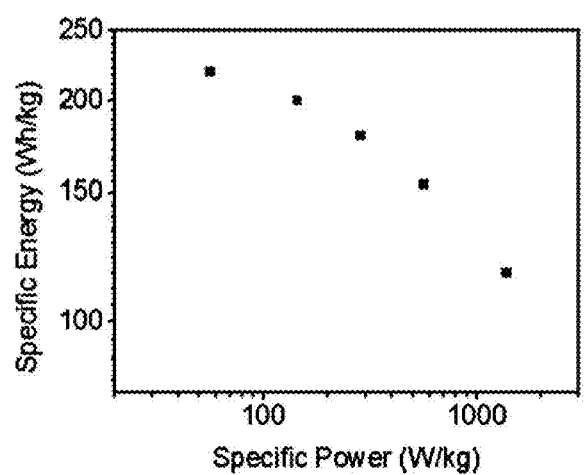
FIG. 14 shows Ragone plot of a flexible lithium ion battery by using LFP/Ni-Cotton as the cathode and LTO/Cu-Cotton as the anode.

Flexible full cells with the LFP/Ni-fabric cathodes and the LTO/Cu-fabric anodes were fabricated by using the Al-plastic pouch as the encapsulation material. Other materials are the same as the fabrication of half cells. The full cells were tested over the voltage range of 0.7-2.4 V. Typical charge/discharge profiles under different C rate are shown in FIG. 12. Results show that the discharged voltage plateau is 1.85 V. The gravimetric capacity of the full cell decreases as the increase of current densities. The specific capacity decreased from 122 mAh/g under 0.2 C to 70 mAh/g under 5 C. The full cells also show satisfied cycle performance and relatively high coulombic efficiency (FIG. 13). The specific energy and specific power of such full cells are summarized as FIG. 14. It can be seen from the figure that the energy density and power density of the full battery are excellent.

Figure 15:
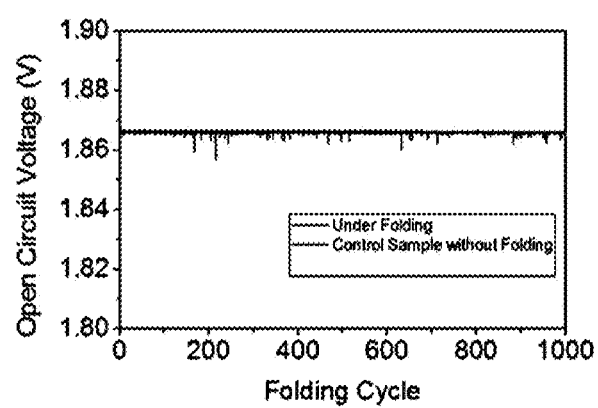
FIG. 15 is a view showing open circuit voltage (OPV) of a flexible lithium ion battery using a current collector according to the present disclosure as a function of folding cycles under 0.1 Hz.

Graphs of the open circuit voltage (OPV) versus time are shown in FIG. 15, with the open circuit voltage of the battery sample not being folded as a reference line. As shown in the figure, the open circuit voltage of the battery only exhibited fluctuation much lower than 0.01V when folding the battery at a frequency of 0.1 Hz. After 1000 folding cycles, the battery can still work normally. The flexible metallic textile-based battery also showed superior stability of energy storage performance when undergoing mechanical deformations.

The above description is only an illustration of preferred embodiments of the present disclosure. Without departing from the spirit and essence of the present disclosure, those skilled in the art can make various corresponding changes, modifications and process optimization, but these corresponding changes, variations and process optimization shall fall within the scope of the present disclosure.

What is claimed is:

1. A method for preparing a current collector, comprising:
    (1) anchoring vinyl groups onto the surface of a textile through the silanization of the hydroxyl groups on the surface of the textile with a coupling agent, wherein the coupling agent is γ-methacryloxypropyltrimethoxysilane;
    (2) synthesizing polyelectrolyte brushes on the surface of the textile through in-situ radical polymerization;
    (3) forming catalyst ions on the polyelectrolyte brushes through ion-exchange and forming a metal-coated layer through subsequent electroless deposition.

2. The method according to claim 1, wherein the catalyst ions are $PdCl_4^{2-}$.

3. The method according to claim 1, wherein the metal-coated layer is a copper-coated layer or a nickel-coated layer.

4. The method according to claim 1, wherein the textile is formed from at least one of cotton and polyester.

5. A current collector, being prepared by the method according to claim 1.

6. The current collector according to claim 5, wherein the current collector has a sheet resistance of less than 0.25 ohms/square.

7. A lithium ion battery, comprising the current collector according to claim 5.

8. The lithium ion battery according to claim 7, wherein an anode material contains $Li_4Ti_5O_{12}$.

9. The lithium ion battery according to claim 7, wherein a cathode material contains $LiFePO_4$.

10. The current collector according to claim 5, wherein the catalyst ions are $PdCl_4^{2-}$.

11. The current collector according to claim 5, wherein the metal-coated layer is a copper-coated layer or a nickel-coated layer.

12. The current collector according to claim 5, wherein the textile is formed from at least one of cotton and polyester.

13. The lithium ion battery according to claim 7, wherein the current collector has a sheet resistance of less than 0.25 ohms/square.

* * * * *